(12) United States Patent
Chen et al.

(10) Patent No.: US 10,475,491 B2
(45) Date of Patent: Nov. 12, 2019

(54) RANDOM CODE GENERATOR WITH ANTIFUSE DIFFERENTIAL CELL AND ASSOCIATED SENSING METHOD

(71) Applicant: eMemory Technology Inc., Hsin-Chu (TW)

(72) Inventors: Yung-Jui Chen, New Taipei (TW); Chih-Hao Huang, Taichung (TW)

(73) Assignee: EMEMORY TECHNOLOGY INC., Hsin-Chu (TW)

( * ) Notice: Subject to any disclaimer, the term of this patent is extended or adjusted under 35 U.S.C. 154(b) by 0 days.

(21) Appl. No.: 15/958,460

(22) Filed: Apr. 20, 2018

(65) Prior Publication Data

US 2018/0315460 A1  Nov. 1, 2018

Related U.S. Application Data

(60) Provisional application No. 62/490,612, filed on Apr. 27, 2017.

(51) Int. Cl.
| | |
|---|---|
| *G11C 17/16* | (2006.01) |
| *G11C 7/22* | (2006.01) |
| *H01L 27/06* | (2006.01) |
| *H01L 27/112* | (2006.01) |
| *G06F 21/73* | (2013.01) |

(Continued)

(52) U.S. Cl.
CPC ............. *G11C 7/22* (2013.01); *G06F 7/00* (2013.01); *G06F 21/73* (2013.01); *G11C 7/062* (2013.01); *G11C 7/12* (2013.01); *G11C 7/24* (2013.01); *G11C 11/5642* (2013.01); *G11C 16/045* (2013.01); *G11C 16/08* (2013.01); *G11C 16/24* (2013.01); *G11C 16/26* (2013.01); *G11C 16/32* (2013.01); *G11C 16/34* (2013.01); *G11C 17/16* (2013.01); *G11C 17/18* (2013.01); *G11C 29/44* (2013.01); *H01L 27/0629* (2013.01); *H01L 27/11206* (2013.01); *H02H 9/04* (2013.01); *H04L 9/0866* (2013.01); *G11C 7/06* (2013.01);

(Continued)

(58) Field of Classification Search
CPC ....................................................... G11C 17/16
USPC ............................................................ 365/96
See application file for complete search history.

(56) References Cited

U.S. PATENT DOCUMENTS

| 7,149,114 | B2 | 12/2006 | Taheri et al. | |
| 9,613,714 | B1 * | 4/2017 | Wong | .................. G06F 12/1408 |

(Continued)

OTHER PUBLICATIONS

European Patent Office, European Search report dated Sep. 19, 2018.

*Primary Examiner* — Min Huang
(74) *Attorney, Agent, or Firm* — WPAT, PC (57) ABSTRACT

A random code generator includes a memory cell array and a sensing circuit. The memory cell array includes plural antifuse differential cells. The sensing circuit has an input terminal and an inverted input terminal. When a first antifuse differential cell of the memory cell array is a selected cell, a bit line of the selected cell is connected with the input terminal of the sensing circuit and an inverted bit line of the selected cell is connected with the inverted input terminal of the sensing circuit. During a read cycle, the sensing circuit judges a storage state of the selected cell according to a first charging current of the bit line and a second charging current of the inverted bit line, and determines a bit of a random code according to the storage state of the selected cell.

11 Claims, 8 Drawing Sheets

(51) Int. Cl.
  *G11C 7/06*   (2006.01)
  *G11C 7/12*   (2006.01)
  *G11C 7/24*   (2006.01)
  *G11C 17/18*  (2006.01)
  *G11C 16/34*  (2006.01)
  *G11C 29/44*  (2006.01)
  *G11C 16/08*  (2006.01)
  *G11C 16/24*  (2006.01)
  *G11C 16/26*  (2006.01)
  *G11C 16/32*  (2006.01)
  *G11C 11/56*  (2006.01)
  *G11C 16/04*  (2006.01)
  *H02H 9/04*   (2006.01)
  *G06F 7/00*   (2006.01)
  *H04L 9/08*   (2006.01)
  *G11C 16/06*  (2006.01)
  *G11C 16/10*  (2006.01)
  *G11C 16/14*  (2006.01)

(52) U.S. Cl.
  CPC .............. *G11C 16/06* (2013.01); *G11C 16/10* (2013.01); *G11C 16/14* (2013.01)

(56) References Cited

U.S. PATENT DOCUMENTS

| | | | |
|---|---|---|---|
| 2004/0095819 A1* | 5/2004 | Joachim | G11C 29/50 365/201 |
| 2012/0106235 A1 | 5/2012 | Christensen et al. | |
| 2013/0208525 A1* | 8/2013 | Peng | G11C 17/16 365/96 |
| 2017/0148527 A1* | 5/2017 | Christensen | G11C 17/16 |

\* cited by examiner

FIG. 1A (PRIOR ART)

| | BL | WL | AF1 | IG | AF2 | BLB |
|---|---|---|---|---|---|---|
| Program | 0V | Vdd | Vpp | Von | Vpp | 0V |
| Read | 0V | Vdd | Vr | Voff | Vr | 0V |

| | BL | AF1 | IG | AF2 | BLB |
|---|---|---|---|---|---|
| Program | 0V | Vpp | Von | Vpp | 0V |
| Read | 0V | Vr | Voff | Vr | 0V |

RANDOM CODE GENERATOR WITH ANTIFUSE DIFFERENTIAL CELL AND ASSOCIATED SENSING METHOD

This application claims the benefit of U.S. provisional application Ser. No. 62/490,612, filed Apr. 27, 2017, the subject matter of which is incorporated herein by reference.

FIELD OF THE INVENTION

The present invention relates to a random code generator and an associated sensing method, and more particularly to a random code generator with an antifuse differential cell and an associated sensing method.

BACKGROUND OF THE INVENTION

As is well known, an antifuse cell is one kind of one time programmable cell (also referred as an OTP cell). The antifuse cell comprises an antifuse transistor. If the voltage difference between the gate terminal and the source/drain terminal of the antifuse transistor is not higher than the withstanding voltage, the antifuse transistor is in a high-resistance state. Whereas, if the voltage difference between the gate terminal and the source/drain terminal of the antifuse transistor is higher than the withstanding voltage, the gate oxide layer of the antifuse transistor is ruptured and the antifuse transistor is in a low-resistance state.

Figure 1A:
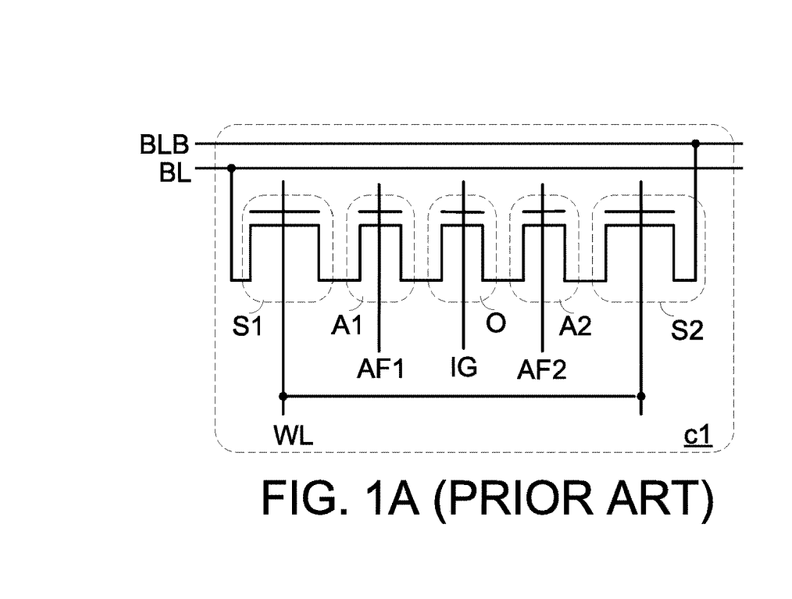
FIG. 1A (prior art) is a schematic equivalent circuit diagram illustrating a conventional antifuse differential cell for generating a random code.
Figure 1B:
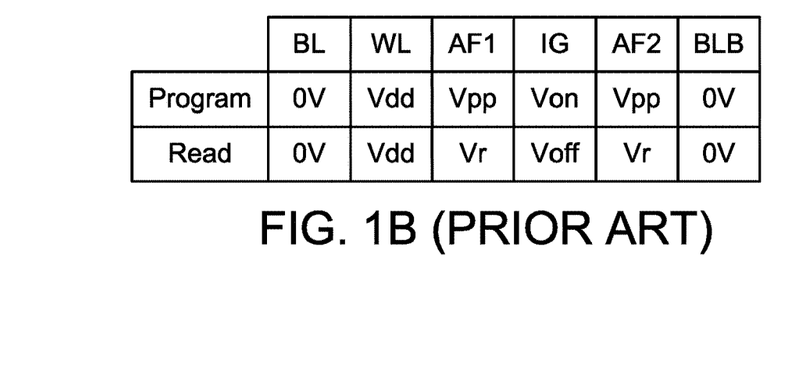
FIG. 1B (prior art) is a bias voltage table illustrating the bias voltages for programming and reading the conventional antifuse differential cell of FIG. 1A.

Moreover, U.S. Pat. No. 9,613,714 disclosed an OTP cell that is able to generate a random code. FIG. 1A is a schematic equivalent circuit diagram illustrating a conventional antifuse differential cell for generating a random code. FIG. 1B is a bias voltage table illustrating the bias voltages for programming and reading the conventional antifuse differential cell of FIG. 1A.

As shown in FIG. 1A, the antifuse differential cell c1 comprises a first select transistor S1, a first antifuse transistor A1, an isolation transistor O, a second antifuse transistor A2 and a second select transistor S2, which are serially connected between a bit line BL and an inverted bit line BLB. The gate terminal of the first select transistor S1 is connected with a word line WL. The gate terminal of the first antifuse transistor A1 is connected with a first antifuse control line AF1. The gate terminal of the isolation transistor O is connected with an isolation control line IG. The gate terminal of the second antifuse transistor A2 is connected with a second antifuse control line AF2. The gate terminal of the second select transistor S2 is connected with the word line WL.

Please refer to FIG. 1B. During a program cycle, a ground voltage (0V) is provided to the bit line BL and the inverted bit line BLB, a select voltage Vdd is provided to the word line WL, a program voltage Vpp is provided to the first antifuse control line AF1 and the second antifuse control line AF2, and an on voltage Von is provided to the isolation control line IG.

During the program cycle, all of the first select transistor S1, the second select transistor S2 and the isolation transistor O are turned on and the state of one of the first antifuse transistor A1 and the second antifuse transistor A2 is changed. For example, the first antifuse transistor A1 is changed to the low-resistance state, but the second antifuse transistor A2 is maintained in the high-resistance state. Alternatively, the second antifuse transistor A2 is changed to the low-resistance state, but the first antifuse transistor A1 is maintained in the high-resistance state.

During a read cycle, the ground voltage (0V) is provided to the bit line BL and the inverted bit line BLB, the select voltage Vdd is provided to the word line WL, a read voltage Vr is provided to the first antifuse control line AF1 and the second antifuse control line AF2, and an off voltage Voff is provided to the isolation control line IG.

During the read cycle, the first select transistor S1 and the second select transistor S2 are turned on, and the isolation transistor O is turned off. The first antifuse transistor A1 and the second antifuse transistor A2 generate read currents to the bit line BL and the inverted bit line BLB. Generally, the read current generated by the antifuse transistor with the low-resistance state is higher, and the read current generated by the antifuse transistor with the high-resistance state is lower. For example, the read current generated by the antifuse transistor with the low-resistance state is 10 µA, and the read current generated by the antifuse transistor with the high-resistance state is 0.1 µA.

During the read cycle, a processing circuit (not shown) determines the storage state of the antifuse differential cell c1 according to the magnitudes of the read currents from first antifuse transistor A1 and the second antifuse transistor A2. In case that the read current generated by the first antifuse transistor A1 is higher and the read current generated by the second antifuse transistor A2 is lower, the antifuse differential cell c1 is verified to have a first storage state. In case that the read current generated by the first antifuse transistor A1 is lower and the read current generated by the second antifuse transistor A2 is higher, the antifuse differential cell c1 is verified to have a second storage state. Due to the manufacturing variations of the antifuse transistors A1 and A2, it is unable to realize which of the antifuse transistors A1 and A2 has the changed state while the reading action is performed. After the antifuse differential cell c1 is programmed, the storage state of the antifuse differential cell c1 is used as a bit of a random code. For example, the eight storage states of the eight programmed antifuse differential cells indicate a one-byte random code.

Figure 2A:
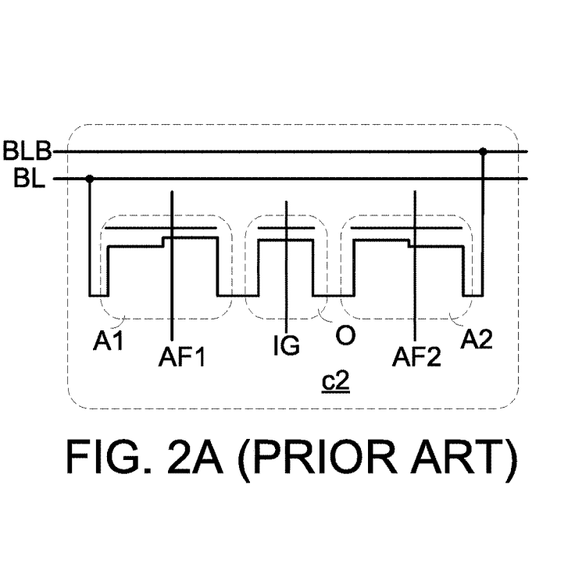
FIG. 2A (prior art) is a schematic equivalent circuit diagram illustrating another conventional antifuse differential cell for generating a random code.
Figure 2B:
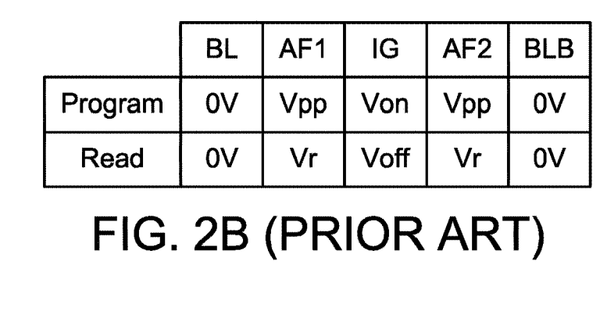
FIG. 2B (prior art) is a bias voltage table illustrating the bias voltages for programming and reading the conventional antifuse differential cell of FIG. 2A.

FIG. 2A is a schematic equivalent circuit diagram illustrating another conventional antifuse differential cell for generating a random code. FIG. 2B is a bias voltage table illustrating the bias voltages for programming and reading the conventional antifuse differential cell of FIG. 2A.

As shown in FIG. 2A, the antifuse differential cell c2 comprises a first antifuse transistor A1, an isolation transistor O and a second antifuse transistor A2, which are serially connected between a bit line BL and an inverted bit line BLB. The gate terminal of the first antifuse transistor A1 is connected with a first antifuse control line AF1. The gate terminal of the isolation transistor O is connected with an isolation control line IG. The gate terminal of the second antifuse transistor A2 is connected with a second antifuse control line AF2.

The gate oxide layer of the first antifuse transistor A1 comprises a first part and a second part. In the first antifuse transistor A1, the first part of the gate oxide layer is closer to the isolation transistor O, and the second part of the gate oxide layer is closer to the bit line BL. The first part of the gate oxide layer is thinner than the second part of the gate oxide layer. Similarly, the second antifuse transistor A2 comprises a first part and a second part. In the second antifuse transistor A2, the first part of the gate oxide layer is closer to the isolation transistor O, and the second part of the gate oxide layer is closer to the inverted bit line BLB. The first part of the gate oxide layer is thinner than the second part of the gate oxide layer.

Please refer to FIG. 2B. During program cycle, a ground voltage (0V) is provided to the bit line BL and the inverted bit line BLB, a program voltage Vpp is provided to the first antifuse control line AF1 and the second antifuse control line AF2, and an on voltage Von is provided to the isolation line IG.

During the program cycle, the storing state of one the first antifuse transistor A1 or the second antifuse transistor A2 is changed. For example, in case that the first part of the gate oxide layer of the first antifuse transistor A1 is ruptured and the first antifuse transistor A1 is changed to the low-resistance state, the second antifuse transistor A2 is maintained in the high-resistance state. Alternatively, in case that the first part of the gate oxide layer of the second antifuse transistor A2 is ruptured and the second antifuse transistor A2 is changed to the low-resistance state, the first antifuse transistor A1 is maintained in the high-resistance state.

During a read cycle, the ground voltage (0V) is provided to the bit line BL and the inverted bit line BLB, a read voltage Vr is provided to the first antifuse control line AF1 and the second antifuse control line AF2, and an off voltage Voff is provided to the isolation control line IG. Consequently, the first antifuse transistor A1 and the second antifuse transistor A2 generate read currents to the bit line BL and the inverted bit line BLB. Subsequently, a processing circuit (not shown) determines the storage state of the antifuse differential cell c2 according to the magnitudes of the read currents from first antifuse transistor A1 and the second antifuse transistor A2.

Due to the manufacturing variations of the antifuse transistors A1 and A2, it is unable to realize which of the antifuse transistors A1 and A2 has the changed state while the reading action is performed. After the antifuse differential cell c2 is programmed, the storage state of the antifuse differential cell c2 is used as a bit of a random code.

Figure 3A:
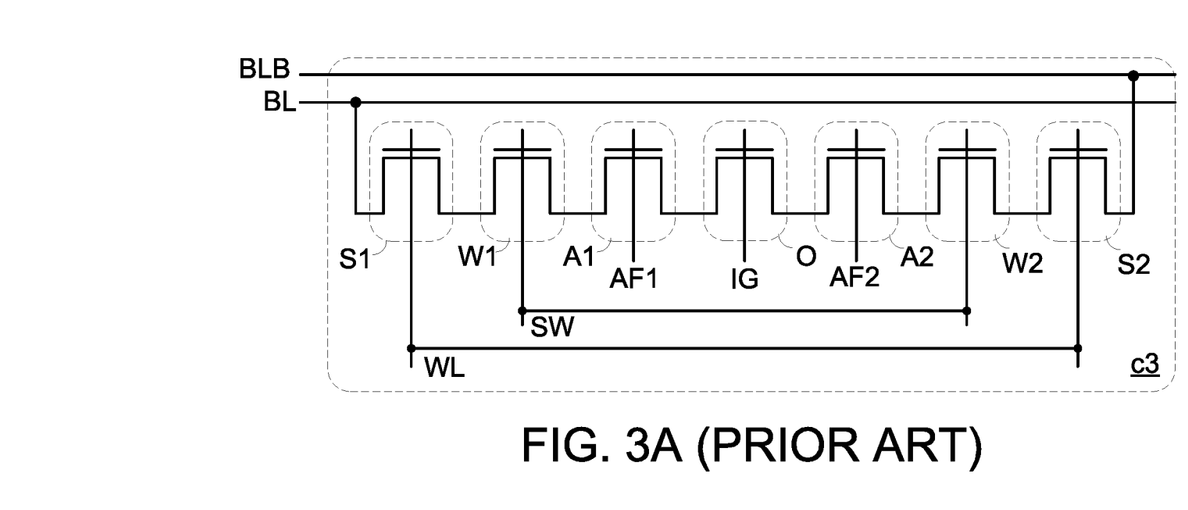
FIG. 3A (prior art) is a schematic equivalent circuit diagram illustrating another conventional antifuse differential cell for generating a random code.
Figure 3B:
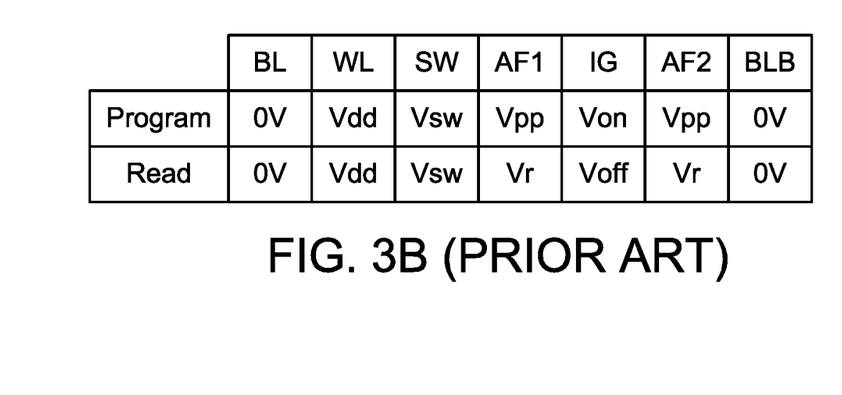
FIG. 3B (prior art) is a bias voltage table illustrating the bias voltages for programming and reading the conventional antifuse differential cell of FIG. 3A.

FIG. 3A is a schematic equivalent circuit diagram illustrating another conventional antifuse differential cell for generating a random code. FIG. 3B is a bias voltage table illustrating the bias voltages for programming and reading the conventional antifuse differential cell of FIG. 3A.

As shown in FIG. 3A, the antifuse differential cell c3 comprises a first select transistor S1, a first switch transistor W1, a first antifuse transistor A1, an isolation transistor O, a second antifuse transistor A2, a second switch transistor W2 and a second select transistor S2, which are serially connected between a bit line BL and an inverted bit line BLB.

The gate terminal of the first select transistor S1 is connected with a word line WL. The gate terminal of the first switch transistor W1 is connected with a switch control line SW. The gate terminal of the first antifuse transistor A1 is connected with a first antifuse control line AF1. The gate terminal of the isolation transistor O is connected with an isolation control line IG. The gate terminal of the second antifuse transistor A2 is connected with a second antifuse control line AF2. The gate terminal of the second switch transistor W2 is connected with a switch control line SW. The gate terminal of the second select transistor S2 is connected with the word line WL.

Please refer to FIG. 3B. During a program cycle, a ground voltage (0V) is provided to the bit line BL and the inverted bit line BLB, a select voltage Vdd is provided to the word line WL, a switch voltage Vsw is provided to the switch control line SW, a program voltage Vpp is provided to the first antifuse control line AF1 and the second antifuse control line AF2, and an on voltage Von is provided to the isolation control line IG.

During the program cycle, all of the first select transistor S1, the second select transistor S2, the first switch transistor W1, the second switch transistor W2 and the isolation transistor O are turned on and the state of one of the first antifuse transistor A1 and the second antifuse transistor A2 is changed. For example, the first antifuse transistor A1 is changed to the low-resistance state, but the second antifuse transistor A2 is maintained in the high-resistance state. Alternatively, the second antifuse transistor A2 is changed to the low-resistance state, but the first antifuse transistor A1 is maintained in the high-resistance state.

During a read cycle, the ground voltage (0V) is provided to the bit line BL and the inverted bit line BLB, the select voltage Vdd is provided to the word line WL, the switch voltage Vsw is provided to the switch control line SW, a read voltage Vr is provided to the first antifuse control line AF1 and the second antifuse control line AF2, and an off voltage Voff is provided to the isolation control line IG.

During the read cycle, the first select transistor S1, the second select transistor S2, the first switch transistor W1 and the second switch transistor W2 are turned on, and the isolation transistor O is turned off. The first antifuse transistor A1 and the second antifuse transistor A2 generate read currents to the bit line BL and the inverted bit line BLB. Subsequently, a processing circuit (not shown) determines the storage state of the antifuse differential cell c3 according to the magnitudes of the read currents from first antifuse transistor A1 and the second antifuse transistor A2.

Due to the manufacturing variations of the antifuse transistors A1 and A2, it is unable to realize which of the antifuse transistors A1 and A2 has the changed state while the reading action is performed. After the antifuse differential cell c3 is programmed, the storage state of the antifuse differential cell c3 is used as a bit of a random code.

Ideally, during the program cycle of the antifuse differential cell, the gate oxide layer of only one antifuse transistor is ruptured and the state is changed. Whereas, the gate oxide layer of the other antifuse transistor is not ruptured, and the state is not changed.

However, in some situations, the gate oxide layers of the two antifuse transistors are ruptured during the program cycle of the antifuse differential cell. Correspondingly, during the read cycle, the read currents generated by the two antifuse transistors of the antifuse differential cell are very large. Under this circumstance, the processing circuit cannot accurately judge the storage state of the antifuse differential cell.

SUMMARY OF THE INVENTION

An embodiment of the present invention provides a random code generator. The random code generator includes a memory cell array and a sensing circuit. The memory cell array includes plural antifuse differential cells. The sensing circuit has an input terminal and an inverted input terminal. When a first antifuse differential cell of the memory cell array is a selected cell, a bit line of the selected cell is connected with the input terminal of the sensing circuit and an inverted bit line of the selected cell is connected with the inverted input terminal of the sensing circuit. During a read cycle, the selected cell generates a first charging current to charge the bit line and generates a second charging current to charge the inverted bit line. If a first voltage of the bit line is higher than a second voltage of the inverted bit line, the sensing circuit discharges the second voltage of the inverted bit line to enhance a voltage difference between the bit line and the inverted bit line. If the second voltage of the inverted bit line is higher than the first voltage of the bit line, the sensing circuit discharges the first voltage of the bit line to enhance the voltage difference between the bit line and the inverted bit line. The sensing circuit judges a storage state of the selected cell according to the voltage difference and determines a bit of a random code according to the storage state of the selected cell.

Another embodiment of the present invention provides a sensing method for a random code generator. The random code generator includes a memory cell array and a sensing circuit. The memory cell array includes plural antifuse differential cells. The sensing method includes following steps. Firstly, a first antifuse differential cell of the memory cell array is selected as a selected cell. Then, a first read voltage is provided to a first antifuse control line of the selected cell, a second read voltage is provided to a second antifuse control line of the selected cell, a bit line of the selected cell is connected to an input terminal of the sensing circuit, and an inverted bit line of the selected cell is connected to an inverted input terminal of the sensing circuit. Then, the bit line and the inverted bit line of the selected cell are pre-charged to a ground voltage. Then, a first charging current is generated to charge the bit line, and a second charging current is generated to charge the inverted bit line. If a first voltage of the bit line is higher than a second voltage of the inverted bit line, the second voltage of the inverted bit line is discharged so as to enhance a voltage difference between the bit line and the inverted bit line. If the second voltage of the inverted bit line is higher than the first voltage of the bit line, the first voltage of the bit line is discharged so as to enhance the voltage difference between the bit line and the inverted bit line. Then, a storage state of the selected cell is judged according to the voltage difference, and a bit of a random code is determined according to the storage state of the selected cell.

Numerous objects, features and advantages of the present invention will be readily apparent upon a reading of the following detailed description of embodiments of the present invention when taken in conjunction with the accompanying drawings. However, the drawings employed herein are for the purpose of descriptions and should not be regarded as limiting.

BRIEF DESCRIPTION OF THE DRAWINGS

The above objects and advantages of the present invention will become more readily apparent to those ordinarily skilled in the art after reviewing the following detailed description and accompanying drawings, in which.

DETAILED DESCRIPTION OF PREFERRED EMBODIMENTS

The present invention provides a random code generator with an antifuse differential cell and an associated sensing method. Even if the read currents generated by the two antifuse transistors of the antifuse differential cell are very large during the read cycle, the sensing circuit of the present invention can still accurately judge the storage state of the antifuse differential cell.

Figure 4:
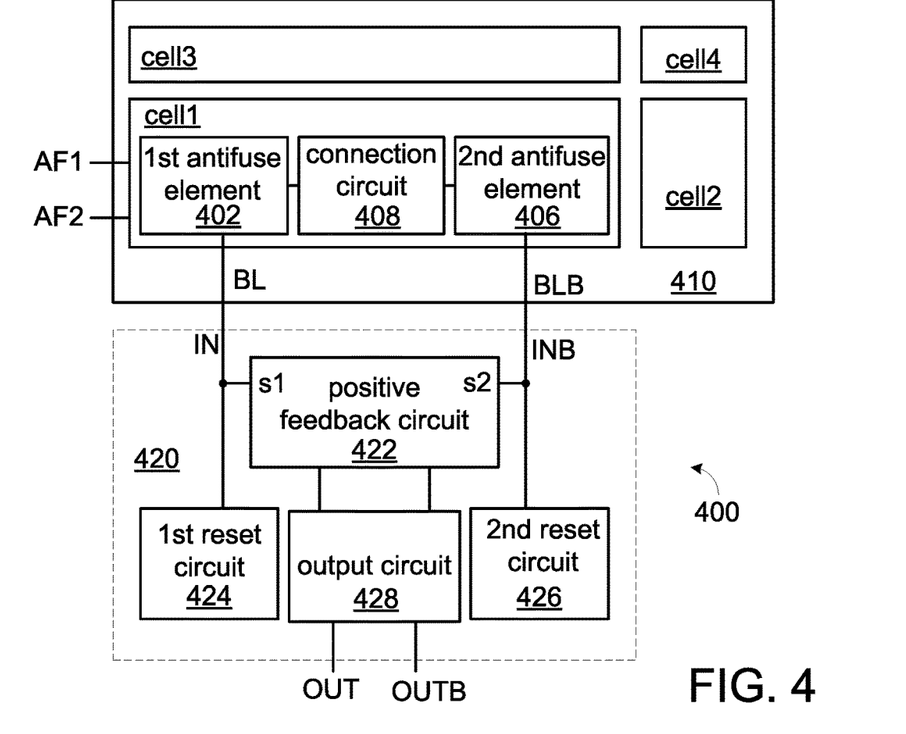
FIG. 4 is a schematic circuit block diagram illustrating the architecture of a random code generator according to a first embodiment of the present invention.

FIG. 4 is a schematic circuit block diagram illustrating the architecture of a random code generator according to a first embodiment of the present invention. As shown in FIG. 4, the random code generator 400 comprises a memory cell array 410 and a sensing circuit 420.

The memory cell array 410 comprises plural antifuse differential cells cell1~cell4, which have the same structures. A bit line BL and an inverted bit line BLB corresponding to the selected cell of the memory cell array 410 are connected with an input terminal IN and an inverted input terminal INB of the sensing circuit 420, respectively. For example, if the antifuse differential cell cell1 is the selected cell during a read cycle, the bit line BL and the inverted bit line BLB corresponding to the antifuse differential cell cell1 are connected with the input terminal IN and the inverted input terminal INB of the sensing circuit 420, respectively. Meanwhile, the sensing circuit 420 determines a storage state of the selected cell (e.g., the antifuse differential cell cell1) according to the read currents from the bit line BL and the inverted bit line BLB.

Similarly, if one of the antifuse differential cells cell2~cell4 is the selected cell, the bit line BL and the inverted bit line BLB corresponding to the selected cell are connected with the input terminal IN and the inverted input terminal INB of the sensing circuit 420, respectively.

The structures of the antifuse differential cells will be described as follows. For example, the antifuse differential cell cell1 comprises a first antifuse element 402, a connection circuit 408 and a second antifuse element 406. Each of the first antifuse element 402 and the second antifuse element 406 comprises an antifuse transistor.

The antifuse differential cells as shown in FIGS. 1A, 2A and 3A can be used as the antifuse differential cells cell1~cell4 of the memory cell array 410. During the program cycle, a program voltage Vpp is provided to the first antifuse control line AF1 and the second antifuse control line AF2. During the read cycle, a read voltage Vr is provided to the first antifuse control line AF1 and the second antifuse control line AF2.

In case that the antifuse differential cell as shown in FIG. 1A is employed, the connection circuit 408 comprises the isolation transistor O, the first antifuse element 402 comprises the first select transistor S1 and the first antifuse transistor A1, and the second antifuse element 406 comprises the second antifuse transistor A2 and the second select transistor S2. In case that the antifuse differential cell as shown in FIG. 2A is employed, the connection circuit 408 comprises the isolation transistor O, the first antifuse element 402 comprises the first antifuse transistor A1, and the second antifuse element 406 comprises the second antifuse transistor A2. In case that the antifuse differential cell as shown in FIG. 3A is employed, the connection circuit 408 comprises the isolation transistor O, the first antifuse element 402 comprises the first select transistor S1, the first switch transistor W1 and the first antifuse transistor A1, and the second antifuse element 406 comprises the second select transistor S2, the second switch transistor W2 and the second antifuse transistor A2.

In addition to the antifuse differential cells as shown in FIGS. 1A, 2A and 3A, the antifuse differential cells with other structures are suitably used in the present invention. For example, in another embodiment, the connection circuit 408 comprises a conducting line in replace of the isolation transistor O as shown in FIGS. 1A, 2A and 3A. That is, the connection circuit 408 is a conducting line, and the conducting line is connected between the first antifuse element 402 and the second antifuse element 406.

In this embodiment, the sensing circuit 420 comprises a positive feedback circuit 422, an output circuit 428, a first reset circuit 424 and a second reset circuit 426. The two sensing terminals s1 and s2 of the positive feedback circuit 422 are connected with the input terminal IN and the inverted input terminal INB of the sensing circuit 420, respectively. The first reset circuit 424 is connected with the input terminal IN of the sensing circuit 420. The second reset circuit 426 is connected with the inverted input terminal INB of the sensing circuit 420. The two input terminals of the output circuit 428 are connected with two output terminals of the positive feedback circuit 422, respectively. An output terminal OUT and an inverted output terminal OUTB of the output circuit 428 generate two output signals that are complementary to each other.

Figure 5:
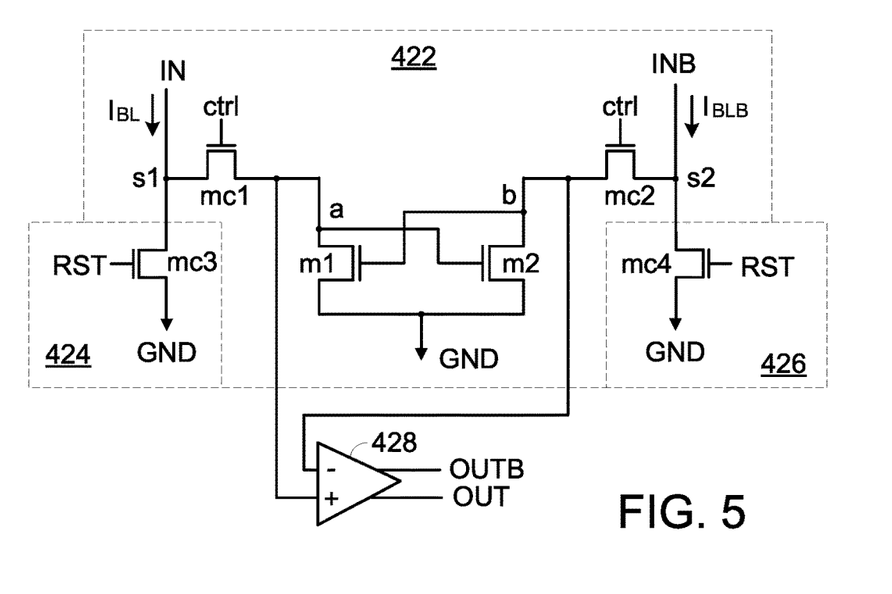
FIG. 5 is a schematic circuit diagram illustrating the sensing circuit of the random code generator according to the first embodiment of the present invention.

FIG. 5 is a schematic circuit diagram illustrating the sensing circuit of the random code generator according to the first embodiment of the present invention.

The positive feedback circuit 422 comprises four transistors mc1, mc2, m1 and m2. The drain terminal of the transistor mc1 is the sensing terminal s1 of the positive feedback circuit 422. The source terminal of the transistor mc1 is connected with a node "a". The gate terminal of the transistor mc1 receives a control signal ctrl. The drain terminal of the transistor mc2 is the sensing terminal s2 of the positive feedback circuit 422. The source terminal of the transistor mc2 is connected with a node "b". The gate terminal of the transistor mc2 receives the control signal ctrl. The drain terminal of the transistor m1 is connected with the node "a". The gate terminal of the transistor m1 is connected with the node "b". The source terminal of the transistor m1 is connected with a ground terminal GND. The drain terminal of the transistor m2 is connected with the node "b". The gate terminal of the transistor m2 is connected with the node "a". The source terminal of the transistor m2 is connected with the ground terminal GND.

The first reset circuit 424 comprises a transistor mc3. The drain terminal of the transistor mc3 is connected with the input terminal IN of the sensing circuit 420. The source terminal of the transistor mc3 is connected with the ground terminal GND. The gate terminal of the transistor mc3 receives a reset signal RST.

The second reset circuit 426 comprises a transistor mc4. The drain terminal of the transistor mc4 is connected with the inverted input terminal INB of the sensing circuit 420. The source terminal of the transistor mc4 is connected with the ground terminal GND. The gate terminal of the transistor mc4 receives the reset signal RST.

In an embodiment, the output circuit 428 is a differential amplifier. The positive input terminal of the differential amplifier is connected with the node "a". The negative input terminal of the differential amplifier is connected with the node "b". The output terminal OUT and the inverted output terminal OUTB of the differential amplifier generates the two complementary output signals. Since the differential amplifier has been widely applied to the electronic circuits, the principles of the differential amplifier are not redundantly described herein.

In the beginning of the read cycle (i.e., a first stage of the read cycle), the transistors mc3 and mc4 are temporarily turned on according to the reset signal RST. Consequently, the bit line BL and the inverted bit line BLB are pre-charged to the ground voltage (i.e., 0V). Then, the selected cell generates read currents $I_{BL}$ and $I_{BLB}$ to charge the bit line BL and the inverted bit line BLB. Consequently, the voltages of the bit line BL and the inverted bit line BLB are gradually increased from 0V. In other words, the read currents $I_{BL}$ and $I_{BLB}$ are charging currents.

Generally, the voltage rising speeds of the bit line BL and the inverted bit line BLB are related to read currents $I_{BL}$ and $I_{BLB}$. For example, if the read current $I_{BL}$ is higher than the read current $I_{BLB}$, the voltage rising speed of the bit line BL is higher than the voltage rising speed of the inverted bit line BLB. Whereas, if the read current $I_{BLB}$ is higher than the read current $I_{BL}$, the voltage rising speed of the inverted bit line BLB is higher than the voltage rising speed of the bit line BL.

Moreover, during the first stage of the read cycle, the transistors mc1 and mc2 are turned on according to the control signal ctrl. Consequently, the node "a" is connected with the bit line BL, and the node "b" is connected with the inverted bit line BLB. Since the voltage rising speeds of the bit line BL and the inverted bit line BLB are different, one of the transistors m1 and m2 is turned on and the other of the transistors m1 and m2 transistors m1 and m2 is turned off.

For example, if the voltage rising speed of the bit line BL is higher than the voltage rising speed of the inverted bit line BLB, the transistor m2 is turned on. Consequently, the voltage of the inverted bit line BLB is discharged and gradually decreased. Since the transistor m1 is turned off, the voltage of the bit line BL is continuously increased. Whereas, if the voltage rising speed of the inverted bit line BLB is higher than the voltage rising speed of the bit line BL, the transistor m1 is turned on. Consequently, the voltage of the bit line BL is discharged and gradually decreased. Since the transistor m2 is turned off, the voltage of the inverted bit line BLB is continuously increased.

In other words, the voltage difference between the bit line BL and the inverted bit line BLB is enhanced by the positive feedback circuit 422 during the first stage of the read cycle. Moreover, since the bit line BL is connected with the node "a" and the inverted bit line BLB is connected with the node "b", the voltage difference between the node "a" and the node "b" is also enhanced.

During a second stage of the read cycle, the transistors mc1 and mc2 are turned off according to the control signal ctrl. According to the voltage difference between the node "a" and the node "b", the output circuit 428 connected between the node "a" and the node "b" generate the output signal and the inverted output signal from the output terminal OUT and the inverted output terminal OUTB. According to the output signal and the inverted output signal, the sensing circuit 420 judges a storage state of the selected cell. Consequently, a bit of a random code is determined.

Figure 6:
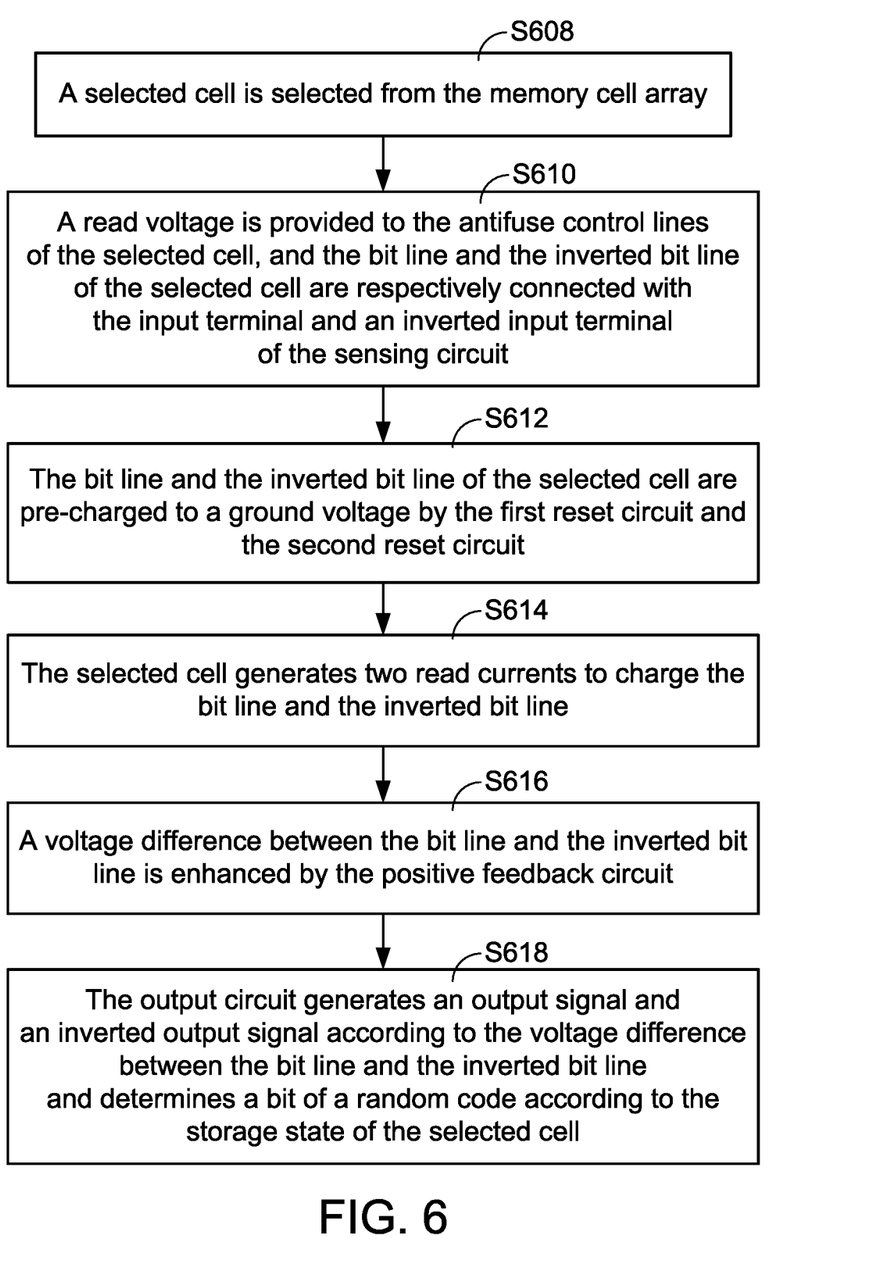
FIG. 6 is a flowchart illustrating a sensing method for the random code generator according to the first embodiment of the present invention.

FIG. 6 is a flowchart illustrating a sensing method for the random code generator according to the first embodiment of the present invention.

Firstly, a selected cell is selected from the memory cell array 410 (Step S608).

Then, a read voltage Vr is provided to the antifuse control lines AF1 and AF2 of the selected cell, and the bit line BL and the inverted bit line BLB of the selected cell are respectively connected with the input terminal IN and an inverted input terminal INB of the sensing circuit 420 (Step S610).

Then, the bit line BL and the inverted bit line BLB of the selected cell are pre-charged to a ground voltage by the first reset circuit 424 and the second reset circuit 426 (Step S612).

Then, the selected cell generates two read currents $I_{BL}$ and $I_{BLB}$ to charge the bit line BL and the inverted bit line BLB (Step S614). In other words, the read currents $I_{BL}$ and $I_{BLB}$ are charging currents for charging the bit line BL and the inverted bit line BLB.

The positive feedback circuit 422 enhances a voltage difference between the bit line and the inverted bit line (Step S616). If the voltage of the bit line BL is higher than the voltage of the inverted bit line BLB, the voltage of the inverted bit line BLB is discharged and the voltage difference between the bit line BL and the inverted bit line BLB is enhanced. Whereas, if the voltage of the inverted bit line BLB is higher than the voltage of the bit line BL, the voltage of the bit line BL is discharged and the voltage difference between the bit line BL and the inverted bit line BLB is enhanced.

Then, the output circuit 428 generates an output signal and an inverted output signal according to the voltage difference between the bit line BL and the inverted bit line BLB and determines a bit of a random code according to the storage state of the selected cell (Step S618).

From the above descriptions, the present invention provides a random code generator with an antifuse differential cell and an associated sensing method. After the antifuse differential cell of the memory cell array 410 is programmed, the sensing circuit 420 judges the storage state of the antifuse differential cell during the read cycle and determines a bit of the random code. Then, the positive feedback circuit 422 of the sensing circuit 420 enhances the voltage difference between the bit line BL and the inverted bit line BLB. Under this circumstance, even if the read currents generated by both of the bit line BL and the inverted bit line BLB are very large, the sensing circuit 420 is still able to accurately judge the storage state of the antifuse differential cell.

During the read cycle, the memory cell array 410 generates the read currents to the bit line BL and the inverted bit line BLB. In addition, the memory cell array 410 also generates leakage currents to the bit line BL and the inverted bit line BLB. For offseting the leakage currents, the random code generator needs to be further improved. In a second embodiment of the present invention, the sensing circuit of the random code generator further comprises two current sinks to offset the leakage currents from the memory cell array.

Figure 7:
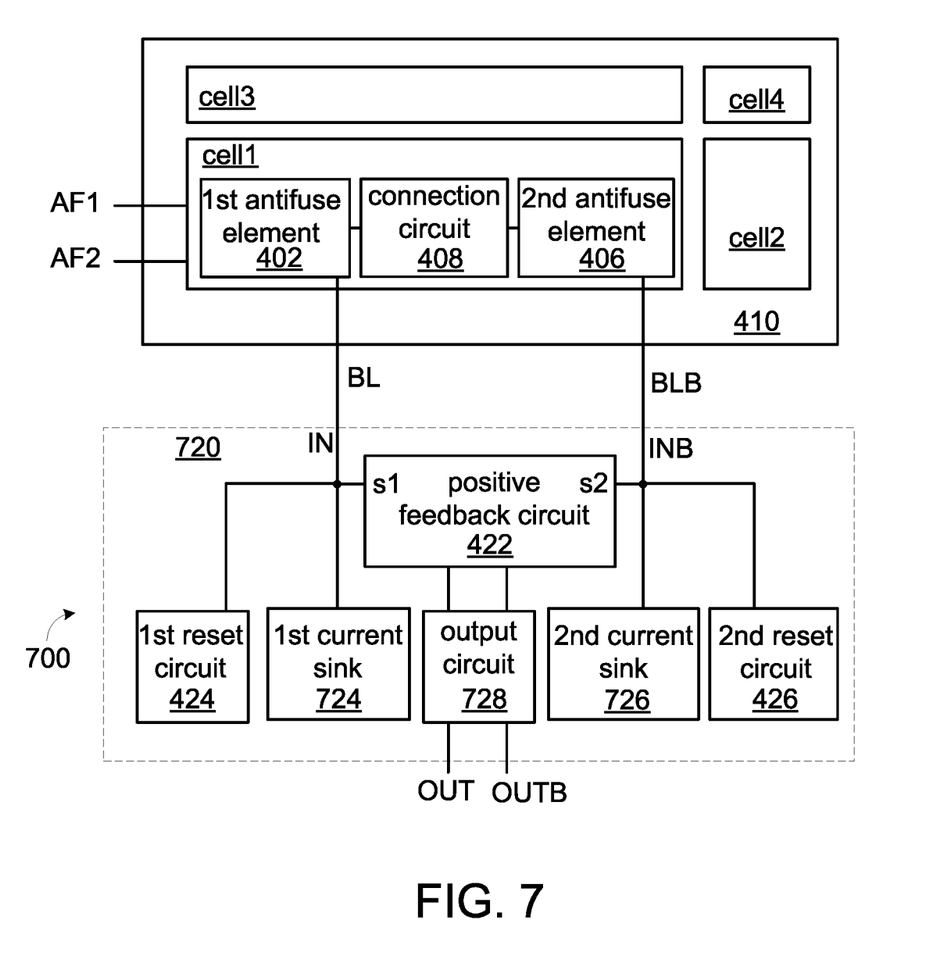
FIG. 7 is a schematic circuit block diagram illustrating the architecture of a random code generator according to a second embodiment of the present invention.

FIG. 7 is a schematic circuit block diagram illustrating the architecture of a random code generator according to a second embodiment of the present invention. As shown in FIG. 7, the random code generator 700 comprises a memory cell array 410 and a sensing circuit 720. The structure of the memory cell array 410 is similar to that of the first embodiment, and is not redundantly described herein.

In this embodiment, the sensing circuit 720 comprises a positive feedback circuit 422, an output circuit 728, a first reset circuit 424, a second reset circuit 426, a first current sink 724 and a second current sink 726. The structures of the first reset circuit 424 and the second reset circuit 426 are similar to those of the first embodiment, and are not redundantly described herein.

The first current sink 724 is connected with the input terminal IN of the sensing circuit 720. The second current sink 726 is connected with the inverted input terminal INB of the sensing circuit 720. The two input terminals of the output circuit 728 are connected with the two output terminals of the positive feedback circuit 422, respectively. Moreover, the output terminal OUT and the inverted output terminal OUTB of the output circuit 728 generate two complementary output signals.

Figure 8A:
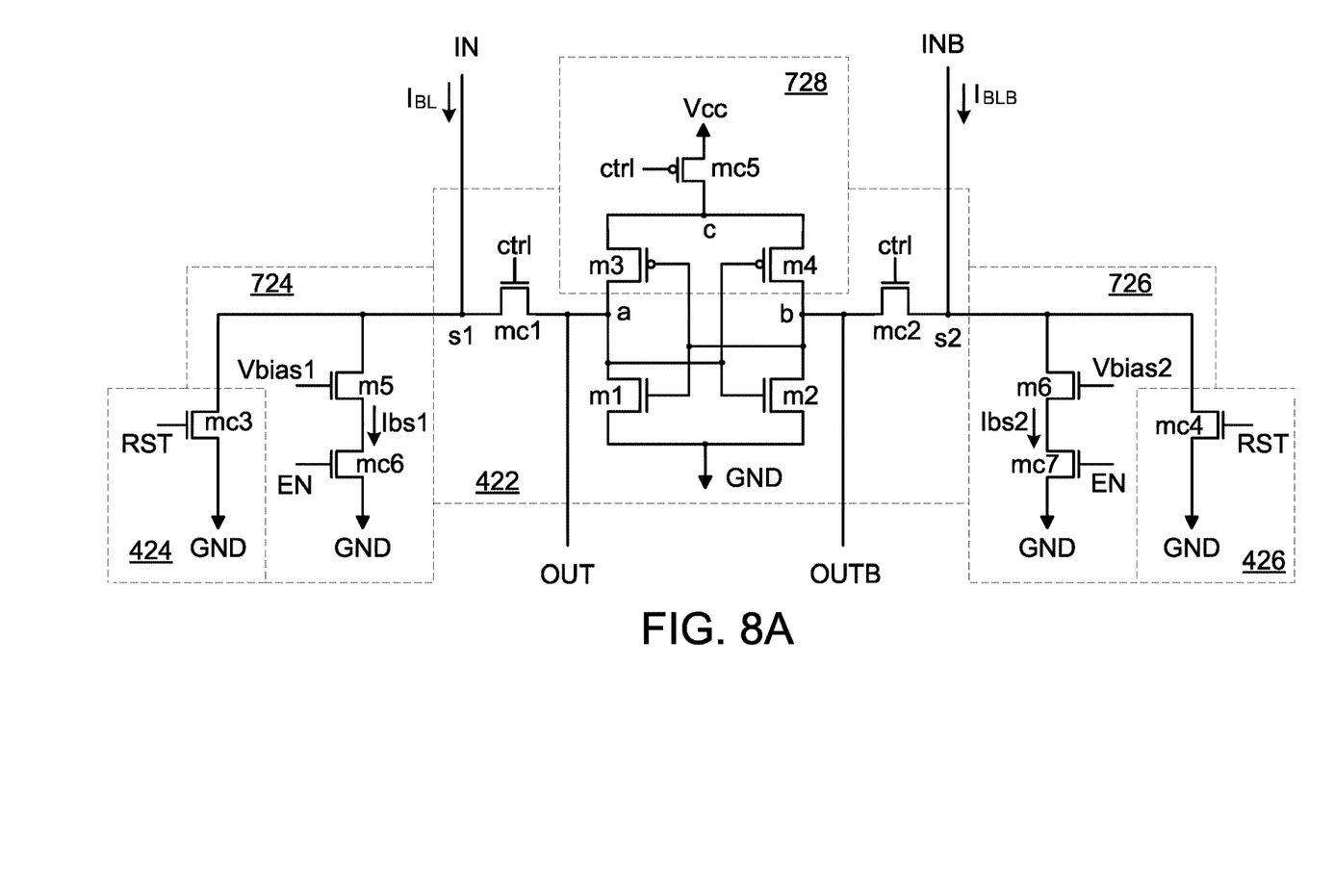
FIG. 8A is a schematic circuit diagram illustrating the sensing circuit of the random code generator according to the second embodiment of the present invention.

FIG. 8A is a schematic circuit diagram illustrating the sensing circuit of the random code generator according to the second embodiment of the present invention. The circuitry structures of the positive feedback circuit 422, the first reset circuit 424 and the second reset circuit 426 are similar to those of FIG. 5, and are not redundantly described herein.

The first current sink 724 comprises transistors m5 and mc6. The drain terminal of the transistor m5 is connected with the input terminal IN of the sensing circuit 720. The gate terminal of the transistor m5 receives a first bias voltage Vbias1. The drain terminal of the transistor mc6 is connected with the source terminal of the transistor m5. The source terminal of the transistor mc6 is connected with the ground terminal GND. The gate terminal of the transistor mc6 receives a read enabling signal EN.

The second current sink 726 comprises transistors m6 and mc7. The drain terminal of the transistor m6 is connected with the inverted input terminal INB of the sensing circuit 720. The gate terminal of the transistor m6 receives a second bias voltage Vbias2. The drain terminal of the transistor mc7 is connected with the source terminal of the transistor m6. The source terminal of the transistor mc7 is connected with the ground terminal GND. The gate terminal of the transistor mc7 receives the read enabling signal EN.

The output circuit 728 comprises transistors m3, m4 and mc5. The source terminal of the transistor mc5 is connected with a power supply voltage Vcc. The gate terminal of the transistor mc5 receives the control signal ctrl. The gate terminal of the transistor mc5 is connected with a node "c". The source terminal of the transistor m3 is connected with the node "c". The drain terminal of the transistor m3 is connected with the node "c". The gate terminal of the transistor m3 is connected with the node "b". The source terminal of the transistor m4 is connected with the node "c". The drain terminal of the transistor m4 is connected with the node "b". The gate terminal of the transistor m4 is connected with the node "c". The node "a" is used as the output terminal OUT. The node "b" is used as the inverted output terminal OUTB. In this embodiment, the output circuit 728 has the above circuitry. In some other embodiment, the output circuit 728 is implemented with any other appropriate differential amplifier.

For example, during the read cycle, the leakage current generated by the memory cell array 410 is 0.5 μA. According to the first bias voltage Vbias1 of the first current sink 724 and the second bias voltage Vbias2 of the second current sink 726, a first bias current Ibias1 generated by the first current sink 724 and a second bias current Ibias2 generated by the second current sink 726 are 0.5 μA. For example, the read currents $I_{BL}$ and $I_{BLB}$ outputted from the bit line BL and the inverted bit line BLB are 12 μA and 1 μA, respectively. After the read currents are offset by the first bias current Ibias1 and the second bias current Ibias2, the two charging currents are 11.5 μA and 0.5 μA, respectively. Consequently, the judging accuracy of the sensing circuit 720 is increased.

Figure 8B:
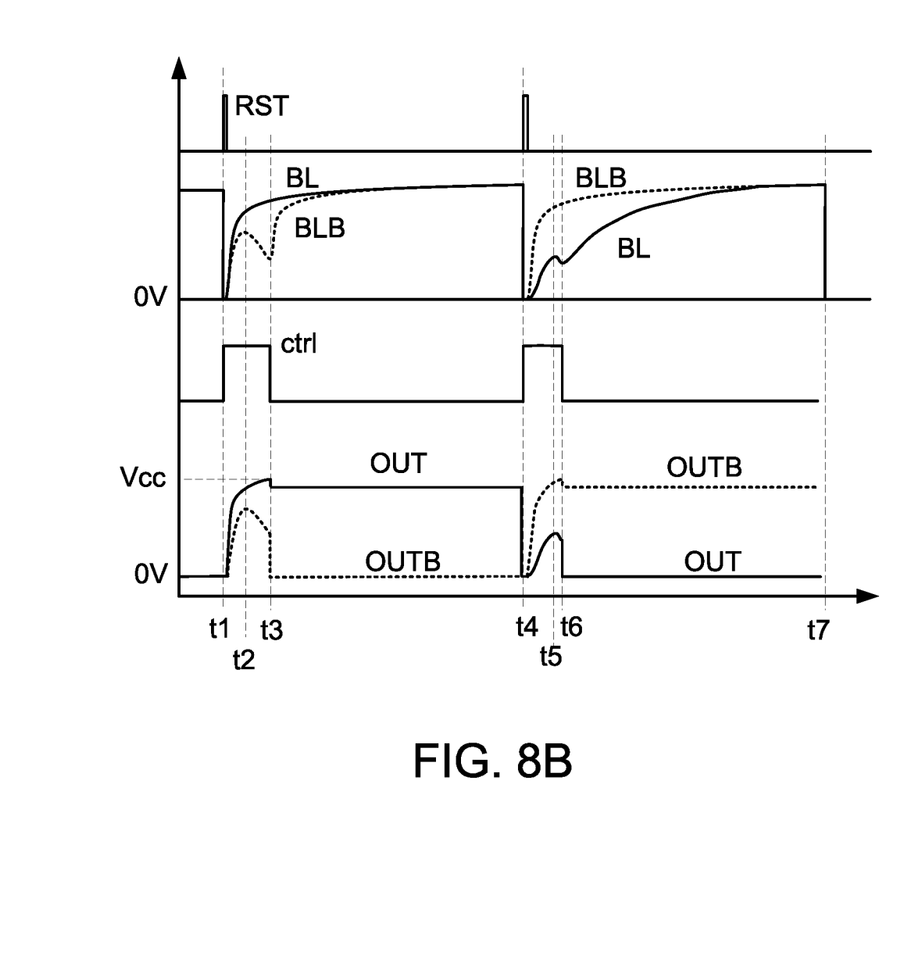
FIG. 8B is a schematic timing waveform diagram illustrating associated signals processed by the sensing circuit of FIG. 8A.

FIG. 8B is a schematic timing waveform diagram illustrating associated signals processed by the sensing circuit of FIG. 8A. During the read cycle, the read enabling signal EN is in a high level state. In the time interval between the time point t1 and the time point t4, the sensing circuit 720 judges the storage state of a first selected cell. In the time interval between the time point t4 and the time point t7, the sensing circuit 720 judges the storage state of a second selected cell. In the first stage of the read cycle, the control signal ctrl is in the high level state. Meanwhile, the transistors mc1 and mc2 are turned on, and the transistor mc5 is turned off. In the second stage of the read cycle, the control signal ctrl is in the low level state. Meanwhile, the transistors mc1 and mc2 are turned off, and the transistor mc5 is turned on.

As shown in FIG. 8B, the time interval between the time point t1 and the time point t3 indicates the first stage of the read cycle. Firstly, the transistors mc3 and mc4 are temporarily turned on according to the reset signal RST. Consequently, the bit line BL and the inverted bit line BLB are pre-charged to the ground voltage (i.e., 0V). Then, the selected cell generates read currents $I_{BL}$ and $I_{BLB}$ to charge the bit line BL and the inverted bit line BLB. Consequently, the voltages of the bit line BL and the inverted bit line BLB are gradually increased from 0V.

At the time point t2, the voltage of the bit line BL is higher than the voltage of the inverted bit line BLB, and the transistor m2 is turned on according to the voltage of the bit line BL. Consequently, after the time point t2, the voltage of the bit line BL is gradually increased and the voltage of the inverted bit line BLB is gradually decreased. Since the bit line BL is connected with the node "a" and the inverted bit line BLB is connected with the node "b", the voltage of the output terminal OUT is equal to the voltage of the bit line BL, and the voltage of the inverted output terminal OUTB is equal to the voltage of the inverted bit line BLB.

The time interval between the time point t3 and the time point t4 indicates the second stage of the read cycle. Meanwhile, the bit line BL is not connected with the node "a", and the inverted bit line BLB is not connected with the node "b". Consequently, the voltage of the inverted bit line BLB is increased again. Moreover, since the transistor mc5 is turned on, the voltage of the output terminal OUT is latched to the power supply voltage Vcc, and the voltage of the inverted output terminal OUTB is latched to the ground voltage (i.e., 0V). Under this circumstance, the first selected cell is judged to have a first storage state.

Similarly, the time interval between the time point t4 and the time point t6 indicates the first stage of the read cycle. Firstly, the transistors mc3 and mc4 are temporarily turned on according to the reset signal RST. Consequently, the bit line BL and the inverted bit line BLB are pre-charged to the ground voltage (i.e., 0V). Then, the selected cell generates read currents $I_{BL}$ and $I_{BLB}$ to charge the bit line BL and the inverted bit line BLB. Consequently, the voltages of the bit line BL and the inverted bit line BLB are gradually increased from 0V.

At the time point t5, the voltage of the inverted bit line BLB is higher than the voltage of the bit line BL, and the transistor m1 is turned on according to the voltage of the inverted bit line BLB. Consequently, after the time point t5, the voltage of the inverted bit line BLB is gradually increased and the voltage of the bit line BL is gradually decreased. Since the bit line BL is connected with the node "a" and the inverted bit line BLB is connected with the node "b", the voltage of the output terminal OUT is equal to the voltage of the bit line BL, and the voltage of the inverted output terminal OUTB is equal to the voltage of the inverted bit line BLB.

The time interval between the time point t6 and the time point t7 indicates the second stage of the read cycle. Meanwhile, the bit line BL is not connected with the node "a", and the inverted bit line BLB is not connected with the node "b". Consequently, the voltage of the bit line BL is increased again. Moreover, since the transistor mc5 is turned on, the voltage of the output terminal OUT is latched to the ground voltage (i.e., 0V), and the voltage of the inverted output terminal OUTB is latched to the power supply voltage Vcc. Under this circumstance, the second selected cell is judged to have a second storage state.

Figure 9:
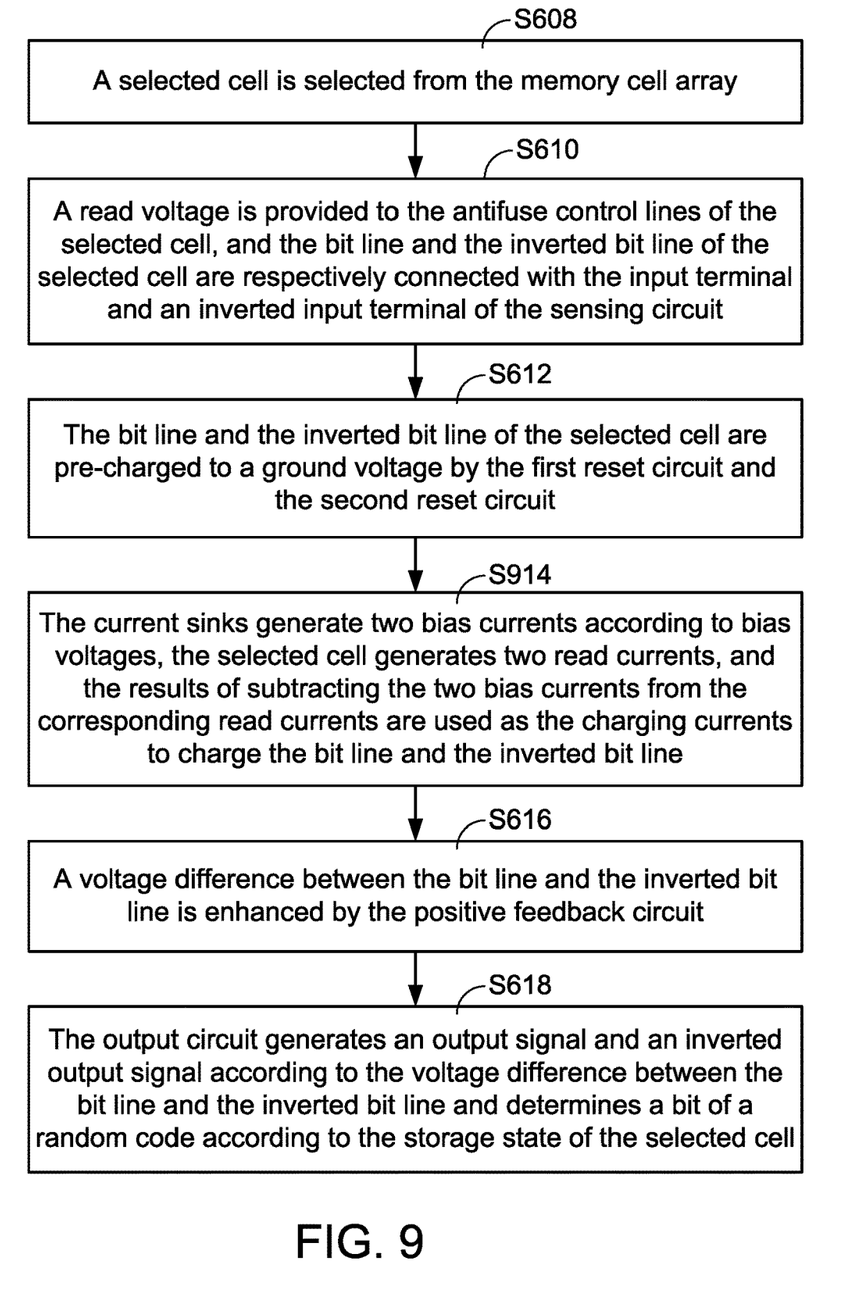
FIG. 9 is a flowchart illustrating a sensing method for the random code generator according to the second embodiment of the present invention.

FIG. 9 is a flowchart illustrating a sensing method for the random code generator according to the second embodiment of the present invention. In comparison with the sensing module of FIG. 6, the sensing method of this embodiment further comprises a step S914 in replace of the step S614. Hereinafter, only the step S914 will be described.

In the step S914, the bias voltages Vbias1 and Vbias2 are provided to the current sinks 724 and 726, so that the current sinks 724 and 726 generate the bias currents Ibs1 and Ibs2. Moreover, the selected cell generates the read currents $I_{BL}$ and $I_{BLB}$. The result of subtracting the bias current Ibs1 from the read current $I_{BL}$, i.e., $(I_{BL}-Ibs1)$, is used as the charging current to charge the bit line BL. The result of subtracting the bias current Ibs2 from the read current $I_{BL}$, i.e., $(I_{BLB}-Ibs2)$, is used as the charging current to charge the inverted bit line BLB.

Since the bias currents Ibs1 and Ibs2 are provided to offset the leakage currents of the memory cell array 401, the judging accuracy of the sensing circuit 720 is increased.

Moreover, the sensing method of FIG. 9 can also be used to judge the quality of the selected cell.

During a first sensing period, the same read voltage Vr is provided to the antifuse control lines AF1 and AF2, and the same bias voltage (i.e., Vbias1=Vbias2) is provided to the two current sinks 724 and 726. Then, the sensing method as described in FIG. 9 is performed to judge the storage state of the selected cell. For example, the sensing circuit 720 judges that the selected cell is in the first storage state.

During a second sensing period, the read voltage Vr1 is provided to the first antifuse control line AF1, the read voltage Vr2 is provided to the second antifuse control line AF2, and the same bias voltage (i.e., Vbias1=Vbias2) is provided to the two current sinks 724 and 726. The read voltage Vr1 is higher than the read voltage Vr2. Then, the sensing method as described in FIG. 9 is performed to judge the storage state of the selected cell. If the sensing circuit 720 judges that the selected cell is in the second storage state, it means that the quality of the selected cell is not good.

If the sensing circuit 720 judges that the selected cell is in the first storage state during the second sensing period, the procedure in a third sensing period is continuously done. During the third sensing period, the read voltage Vr1 is provided to the first antifuse control line AF1, the read voltage Vr2 is provided to the second antifuse control line AF2, and the same bias voltage (i.e., Vbias1=Vbias2) is provided to the two current sinks 724 and 726. The read voltage Vr1 is lower than the read voltage Vr2. Then, the sensing method as described in FIG. 9 is performed to judge the storage state of the selected cell. If the sensing circuit 720 judges that the selected cell is in the second storage state, it means that the quality of the selected cell is not good.

If the sensing circuit 720 judges that the selected cell is in the first storage state during the third sensing period, the procedure in a fourth sensing period is continuously done. During the fourth sensing period, the same read voltage Vr is provided to the antifuse control lines AF1 and AF2, and different bias voltages (i.e., Vbias1>Vbias2) is provided to the two current sinks 724 and 726. Then, the sensing method as described in FIG. 9 is performed to judge the storage state of the selected cell. If the sensing circuit 720 judges that the selected cell is in the second storage state, it means that the quality of the selected cell is not good.

If the sensing circuit 720 judges that the selected cell is in the first storage state during the fourth sensing period, the procedure in a fifth sensing period is continuously done. During the fifth sensing period, the same read voltage Vr is provided to the antifuse control lines AF1 and AF2, and different bias voltages (i.e., Vbias1<Vbias2) is provided to the two current sinks 724 and 726. Then, the sensing method as described in FIG. 9 is performed to judge the storage state of the selected cell. If the sensing circuit 720 judges that the selected cell is in the second storage state, it means that the quality of the selected cell is not good.

If the sensing circuit 720 judges that the selected cell is in the first storage state after all of the five sensing periods, it means that the quality of the selected cell is good.

From the above descriptions, the present invention provides a random code generator with an antifuse differential cell and an associated sensing method. After the antifuse differential cell of the memory cell array is programmed, the sensing circuit is capable of judging the storage state of the antifuse differential cell during the read cycle and determining a bit of the random code.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A random code generator, comprising:
a memory cell array comprising plural antifuse differential cells; and
a sensing circuit having an input terminal and an inverted input terminal, wherein when a first antifuse differential cell of the memory cell array is a selected cell, a bit line of the selected cell is connected with the input terminal of the sensing circuit and an inverted bit line of the selected cell is connected with the inverted input terminal of the sensing circuit,
wherein the sensing circuit further comprises a first current sink capable of generating a first bias current and a second current sink capable of generating a second bias current;
wherein the first current sink comprises a first transistor and a second transistor; a drain terminal of the first transistor is connected with the input terminal of the sensing circuit; a gate terminal of the first transistor receives a first bias voltage; a drain terminal of the second transistor is connected with a source terminal of the first transistor; a gate terminal of the second transistor receives a read enabling signal; and a source terminal of the second transistor is connected with the ground terminal;
wherein the second current sink comprises a third transistor and a fourth transistor; a drain terminal of the third transistor is connected with the inverted input terminal of the sensing circuit; a gate terminal of the third transistor receives a second bias voltage; a drain terminal of the fourth transistor is connected with a source terminal of the third transistor; a gate terminal of the fourth transistor receives the read enabling signal; and a source terminal of the fourth transistor is connected with the ground terminal;
wherein during a read cycle, the selected cell generates a first read current and a second read current; a first charging current is generated by subtracting the first bias current from the first read current to charge the bit line; and a second charging current is generated by subtracting the second bias current from the second read current to charge the inverted bit line,
wherein if a first voltage of the bit line is higher than a second voltage of the inverted bit line, the sensing circuit discharges the second voltage of the inverted bit line to enhance a voltage difference between the bit line and the inverted bit line, wherein if the second voltage of the inverted bit line is higher than the first voltage of the bit line, the sensing circuit discharges the first voltage of the bit line to enhance the voltage difference between the bit line and the inverted bit line, wherein the sensing circuit judges a storage state of the selected cell according to the voltage difference and determines a bit of a random code according to the storage state of the selected cell.

2. The random code generator as claimed in claim 1, wherein the first antifuse differential cell comprises:
a first antifuse element connected with a first antifuse control line and the bit line;
a second antifuse element connected with a second antifuse control line and the inverted bit line; and
a connection circuit connected between the first antifuse element and the second antifuse element.

3. The random code generator as claimed in claim 2, wherein the first antifuse element comprises a first select transistor and a first antifuse transistor, wherein a first terminal of the first select transistor is connected with the bit line, a gate terminal of the first select transistor is connected with a word line, a first terminal of the first antifuse transistor is connected with a second terminal of the first select transistor, and a gate terminal of the first antifuse transistor is connected with a first antifuse control line;
wherein the second antifuse element comprises a second select transistor and a second antifuse transistor, wherein a first terminal of the second select transistor is connected with the inverted bit line, a gate terminal of the second select transistor is connected with the word line, a first terminal of the second antifuse transistor is connected with a second terminal of the second select transistor, and a gate terminal of the second antifuse transistor is connected with a second antifuse control line;

a connection circuit comprising an isolation transistor, wherein a first terminal of the isolation transistor is connected with a second terminal of the first antifuse transistor, a second terminal of the isolation transistor is connected with a second terminal of the second antifuse transistor, and a gate terminal of the isolation transistor is connected with an isolation control line.

4. The random code generator as claimed in claim 2, wherein the first antifuse element comprises a first antifuse transistor, wherein a first terminal of the first antifuse transistor is connected with the bit line, and a gate terminal of the first antifuse transistor is connected with a first antifuse control line;

wherein the second antifuse element comprises a second antifuse transistor, wherein a first terminal of the second antifuse transistor is connected with the inverted bit line, and a gate terminal of the second antifuse transistor is connected with a second antifuse control line;

a connection circuit comprising an isolation transistor, wherein a first terminal of the isolation transistor is connected with a second terminal of the first antifuse transistor, a second terminal of the isolation transistor is connected with a second terminal of the second antifuse transistor, and a gate terminal of the isolation transistor is connected with an isolation control line.

5. The random code generator as claimed in claim 2, wherein the first antifuse element comprises a first select transistor, a first switch transistor and a first antifuse transistor, wherein a first terminal of the first select transistor is connected with the bit line, a gate terminal of the first select transistor is connected with a word line, a first terminal of the first switch transistor is connected with a second terminal of the first select transistor, a gate terminal of the first switch transistor is connected with a switch control line, a first terminal of the first antifuse transistor is connected with a second terminal of the first switch transistor, and a gate terminal of the first antifuse transistor is connected with a first antifuse control line;

wherein the second antifuse element comprises a second select transistor, a second switch transistor and a second antifuse transistor, wherein a first terminal of the second select transistor is connected with the inverted bit line, a gate terminal of the second select transistor is connected with the word line, a first terminal of the second switch transistor is connected with a second terminal of the second select transistor, a gate terminal of the second switch transistor is connected with the switch control line, a first terminal of the second antifuse transistor is connected with a second terminal of the second switch transistor, and a gate terminal of the second antifuse transistor is connected with a second antifuse control line;

a connection circuit comprising an isolation transistor, wherein a first terminal of the isolation transistor is connected with a second terminal of the first antifuse transistor, a second terminal of the isolation transistor is connected with a second terminal of the second antifuse transistor, and a gate terminal of the isolation transistor is connected with an isolation control line.

6. The random code generator as claimed in claim 1, wherein the sensing circuit comprises:

a positive feedback circuit, wherein a first sensing terminal and a second sensing terminal of the positive feedback circuit are connected with the input terminal and the inverted input terminal of the sensing circuit, respectively;

a first reset circuit connected with the input terminal of the sensing circuit;

a second reset circuit connected with the inverted input terminal of the sensing circuit; and an output circuit, wherein two input terminals of the output circuit are connected with the positive feedback circuit, and an output terminal and an inverted output terminal of the output circuit generate two complementary output signals.

7. The random code generator as claimed in claim 6, wherein the positive feedback circuit comprises:

a fifth transistor, wherein a drain terminal of the fifth transistor is connected with the first sensing terminal, a gate terminal of the fifth transistor receives a control signal, and a source terminal of the fifth transistor is connected with a first node;

a sixth transistor, wherein a drain terminal of the sixth transistor is connected with the second sensing terminal, a gate terminal of the sixth transistor receives the control signal, and a source terminal of the sixth transistor is connected with a second node;

a seventh transistor, wherein a drain terminal of the seventh transistor is connected with the first node, a gate terminal of the seventh transistor is connected with the second node, and a source terminal of the seventh transistor is connected with a ground terminal; and a eighth transistor, wherein a drain terminal of the eighth transistor is connected with the second node, a gate terminal of the eighth transistor is connected with the first node, and a source terminal of the eighth transistor is connected with the ground terminal.

8. The random code generator as claimed in claim 7, wherein the first reset circuit comprises a ninth transistor, wherein a drain terminal of the ninth transistor is connected with the first sensing terminal, a gate terminal of the ninth transistor receives a reset signal, and a source terminal of the ninth transistor is connected with the ground terminal.

9. The random code generator as claimed in claim 8, wherein the second reset circuit comprises a tenth transistor, wherein a drain terminal of the tenth transistor is connected with the second sensing terminal, a gate terminal of the tenth transistor receives the reset signal, and a source terminal of the tenth transistor is connected with the ground terminal.

10. The random code generator as claimed in claim 9, wherein the output circuit is a differential amplifier.

11. A sensing method for a random code generator, the random code generator comprising a memory cell array and a sensing circuit, the memory cell array comprising plural antifuse differential cells, the sensing method comprising steps of:

selecting a first antifuse differential cell of the memory cell array as a selected cell;

providing a first read voltage to a first antifuse control line of the selected cell, providing a second read voltage to a second antifuse control line of the selected cell, connecting a bit line of the selected cell to an input terminal of the sensing circuit, and connecting an inverted bit line of the selected cell to an inverted input terminal of the sensing circuit;

pre-charging the bit line and the inverted bit line of the selected cell to a ground voltage;

generating a first bias current according to a first bias voltage, and generating a second bias current according to a second bias voltage;

subtracting the first bias current from a first read current of the selected cell, so that a first charging current is generated to charge the bit line;

subtracting the second bias current from a second read current of the selected cell, so that a second charging current is generated to charge the inverted bit line;

if a first voltage of the bit line is higher than a second voltage of the inverted bit line, discharging the second voltage of the inverted bit line to enhance a voltage difference between the bit line and the inverted bit line;

if the second voltage of the inverted bit line is higher than the first voltage of the bit line, discharging the first voltage of the bit line to enhance the voltage difference between the bit line and the inverted bit line; and judging a storage state of the selected cell according to the voltage difference, and determining a bit of a random code according to the storage state of the selected cell.

* * * * *